United States Patent
Volk

(10) Patent No.: US 9,951,585 B1
(45) Date of Patent: Apr. 24, 2018

(54) METHOD OF INDUCING MICRO-SEISMIC FRACTURES AND DISLOCATIONS OF FRACTURES

(71) Applicant: William W. Volk, Portola Valley, CA (US)

(72) Inventor: William W. Volk, Portola Valley, CA (US)

( * ) Notice: Subject to any disclaimer, the term of this patent is extended or adjusted under 35 U.S.C. 154(b) by 569 days.

(21) Appl. No.: 14/626,527

(22) Filed: Feb. 19, 2015

Related U.S. Application Data

(63) Continuation of application No. 14/610,028, filed on Jan. 30, 2015.

(60) Provisional application No. 61/933,348, filed on Jan. 30, 2014.

(51) Int. Cl.
  *E21B 43/26* (2006.01)
  *E21B 43/00* (2006.01)

(52) U.S. Cl.
  CPC .......... *E21B 43/003* (2013.01); *E21B 43/26* (2013.01)

(58) Field of Classification Search
  CPC ...... E21B 43/25–43/267; E21B 43/003; E21B 28/00
  See application file for complete search history.

(56) References Cited

U.S. PATENT DOCUMENTS

| | | | |
|---|---|---|---|
| 3,016,095 A | * | 1/1962 | Bodine ................. E21B 43/003 166/177.1 |
| 4,020,919 A | | 5/1977 | Broding |
| 4,114,689 A | * | 9/1978 | Dismukes ............... E21B 43/00 166/249 |
| 4,280,200 A | | 7/1981 | Silverman |
| 4,885,726 A | | 12/1989 | Myers |
| 5,771,170 A | | 6/1998 | Withers et al. |
| 5,963,508 A | | 10/1999 | Withers |

(Continued)

OTHER PUBLICATIONS

Pinnacle, "Uncertainty Analysis of Hydraulic Fracture Parameters Measured by Tiltmeter Mapping", 2011, Publisher: Pinnacle, a Halliburton Company, Published in: US.

(Continued)

*Primary Examiner* — D. Andrews
(74) *Attorney, Agent, or Firm* — Crowe & Dunlevy; Terry L. Watt

(57) ABSTRACT

There is taught herein a method of inducing micro fractures and fracture slip in formations thereby creating new dislocations in pre-existing fractures during hydraulic fracturing operations. An embodiment uses multi-component generated signals from multiple seismic signal generators located on or below the surface; and rotating the generated signals such that their vectors of propagation can be varied and optimized for inducing the micro-seismic and fracture slip events for highest cumulative hydrocarbon extraction considering the mechanical properties and direction of the stresses and pre-existing fractures. Embodiments relate to methods for inducing additional seismic events and fracture slip during hydraulic fracturing, particularly micro-seismic events and fracture slip which improve the short and long term production from the reservoir formation. More specifically, but not by way of limitation, embodiments of the present invention relate to such methods for inducing and optimizing the events in the target reservoir formation.

16 Claims, 7 Drawing Sheets

(56) References Cited

U.S. PATENT DOCUMENTS

| | | |
|---|---|---|
| 7,391,675 B2 | 6/2008 | Drew |
| 7,647,183 B2 | 1/2010 | Jechumtalova et al. |
| 7,660,199 B2 | 2/2010 | Drew |
| 7,676,326 B2 | 3/2010 | Podladchikov et al. |
| 7,967,069 B2 | 6/2011 | Beasley |
| 8,157,011 B2 | 4/2012 | Taylor et al. |
| 8,210,262 B2 | 7/2012 | Beasley |
| 8,644,110 B2 | 2/2014 | Kamata |
| 9,169,707 B1 * | 10/2015 | Gilstad ............... E21B 28/00 |
| 2012/0132416 A1 | 5/2012 | Zolezzi-Garreton |
| 2012/0250460 A1 | 10/2012 | Edme et al. |
| 2013/0000908 A1 * | 1/2013 | Walters ............... B21B 43/263 166/299 |
| 2013/0079935 A1 | 3/2013 | Kabannik et al. |
| 2013/0140031 A1 | 6/2013 | Cohen et al. |
| 2013/0199781 A1 | 8/2013 | Dale et al. |
| 2013/0199789 A1 | 8/2013 | Liang et al. |
| 2013/0206412 A1 | 8/2013 | Dale et al. |
| 2013/0211807 A1 | 8/2013 | Templeton-Barrett et al. |
| 2013/0215716 A1 | 8/2013 | Hoffland et al. |
| 2013/0215717 A1 | 8/2013 | Hofland et al. |
| 2015/0138924 A1 * | 5/2015 | Schaefers ............ G10K 11/18 367/138 |

OTHER PUBLICATIONS

Rutledge, et al., "Hydraulic Stimulation of Natural Fractures as Revealed by Induced Microearthquakes, Carthage Cotton Valley Gas Field, Texas", 2001, pp. 1-37, Publisher: Geophysics Group, Los Alamos National Laboratory, Published in: US.

Shakib, "Numerical Modeling of Hydraulic Fracture Propagation: Accounting for the Effect of Stresses on the Interaction Between Hydraulic and Parallel Natural Fractures", Dec. 8, 2013, pp. 557-563, vol. 22, Publisher: Egyptian Petroleum Research Institute, Published in: EG.

* cited by examiner

METHOD OF INDUCING MICRO-SEISMIC FRACTURES AND DISLOCATIONS OF FRACTURES

CROSS REFERENCE TO RELATED APPLICATIONS

This application claims the benefit of U.S. Provisional Patent Application Ser. No. 61/933,348 filed on Jan. 30, 2014, and is a continuation of co-pending U.S. patent application Ser. No. 14/610,028 filed Jan. 30, 2015, and incorporates said applications by reference into this document as if fully set out at this point.

TECHNICAL FIELD

This disclosure relates to the general subject of oil production and, more particularly, to systems and methods for enhancing oil production using hydraulic fracturing of reservoir formations.

BACKGROUND

Seismic hydraulic fracturing ("fracking" colloquially) is becoming an increasingly important method of producing oil from tight formations. Fracking is the fracturing of rock by a delivering pressurized liquid to a target formation. Typically, water, which is mixed with sand and specialized chemicals, is injected under high pressure into the formation to create small fractures in the rock. The fractures provide pathways for the fluids trapped therein (e.g., oil and gas) to reach the well bore where they can be extracted after the hydraulic pressure is removed. On function of the sand is to block the fractures in an open position after the pressure is removed.

Typically, formation fractures are separated on the order of millimeters when normal forces are applied with high pressure fluid during hydraulic fracturing. Since the hydraulic forces are normal to the plane of the fracture, the hydraulic fracturing operation may or may not successfully induce the fracture to dislocate. The stresses which reside on the fracture interface may not overcome remaining friction cause by non-planar heterogeneity of the fracture plane. Proppants are sometimes used to hold fractures open but are only delivered to fractures large enough to fit the proppant. However, many fractures are never open enough to allow proppant to enter.

As is well known in the hydraulic fracking arts, there has been a need for a system and method that provides a better way to improve the effectiveness of this technique. Accordingly, it should now be recognized, as was recognized by the present inventors, that there exists, and has existed for some time, a very real need for a method of further improving the resulting formation permeability from hydraulic fracturing that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

Embodiments of the present invention describe a technique of inducing new fractures/fracture slip in formations [2] and creating new dislocations in pre-existing formation fractures [15a] and new fractures during hydraulic fracturing operations of reservoir formations via micro-seismic events. The method of inducing such micro-seismic events and fracture slip in formations around hydrocarbon wells [5, 7] during hydraulic fracturing operations is described using the steps of creating multi-component generated signals from two or more seismic signal generators located on the surface or below the surface and in the vicinity of the section of a vertical wellbore [7] or horizontal wellbore [5] with multiple sections [6] where each segment (or stage) [8, 14] individually undergoes hydraulic fracturing; and rotating the generated signals such that their combined vectors of propagation can be varied and optimized for inducing the micro-seismic and fracture slip events for highest cumulative hydrocarbon extraction considering the mechanical properties and direction of the mechanical properties of the formation.

Embodiments of this invention relate to methods for inducing additional seismic events and fracture slip during hydraulic fracturing, particularly micro-seismic events and fracture slip which improves the shorter term initial production and long term production from the reservoir formation. More specifically, but not by way of limitation, embodiments of the present invention relate to such methods for inducing micro-seismic events including dislocations to optimize permeability in the target reservoir formation.

Delivering a generated seismic wave or waves to the opened fractures of the formation during hydraulic fracturing will provide a new pulse of force/stress with a displacing seismic wave [16] to overcome such friction caused by non-planar heterogeneity and will induce dislocations, or slips, in the opened fractures. When the hydraulic fracturing pressures are relieved, then the open but now dislocated fractures will only partially return to their original state leaving a gap in the fracture [15c].

It is critical for purposes of an embodiment that two or more seismic generators be chosen such that they vibrate the earth at slightly different frequencies. This difference in frequencies operates to create, in some embodiments, a sweeping of the subsurface by seismic waves where the waveforms coincide.

Other embodiments and variations are certainly possible within the scope of the instant invention and can readily be formulated by those of ordinary skill in the art based on the disclosure herein.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 7b contains a plan view of the embodiment of FIG. 7a.

DETAILED DESCRIPTION

Figure 1:
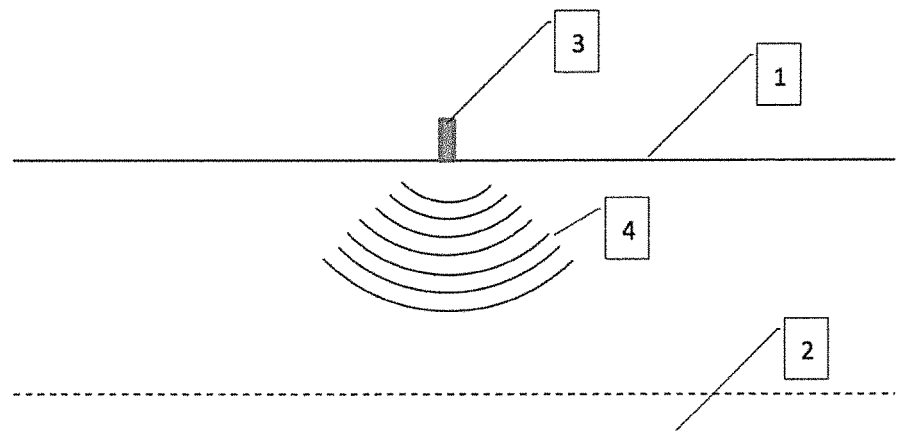
FIG. 1 shows a schematic drawing of an embodiment of the invention.
Figure 2:
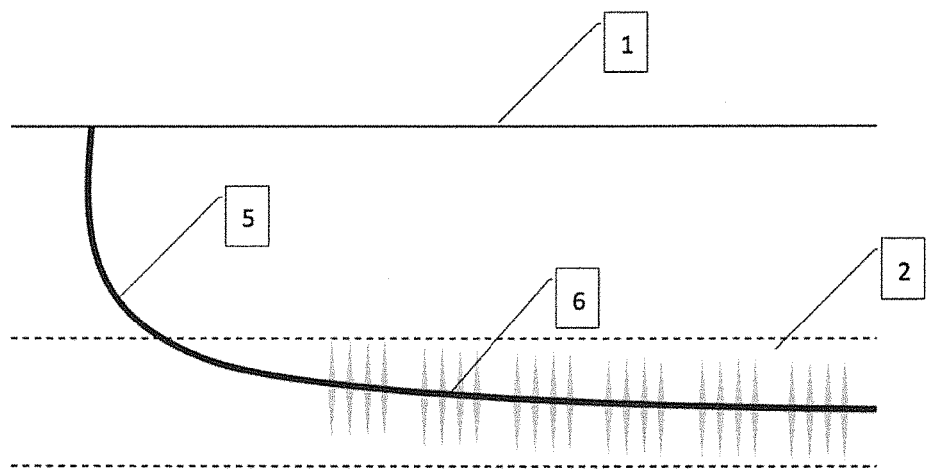
FIG. 2 shows a schematic drawing of the subsurface containing a wellbore and a target formation.
Figure 4:
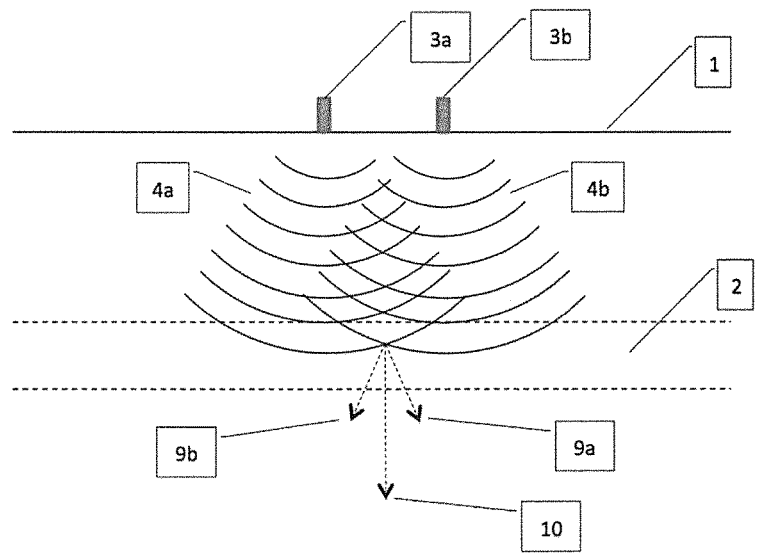
FIG. 4 shows an embodiment of the invention.
Figure 3:
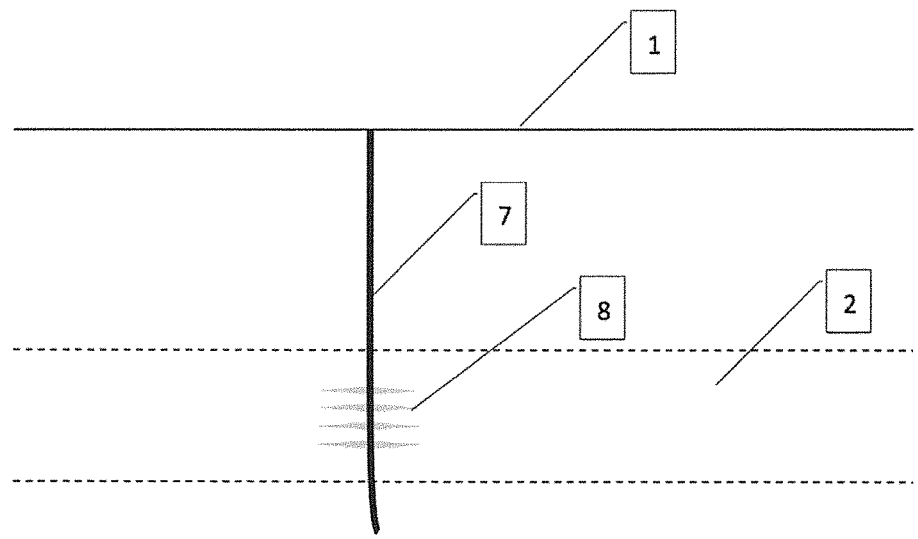
FIG. 3 contains a schematic drawing of the subsurface as it relates to the present invention.
Figure 5:
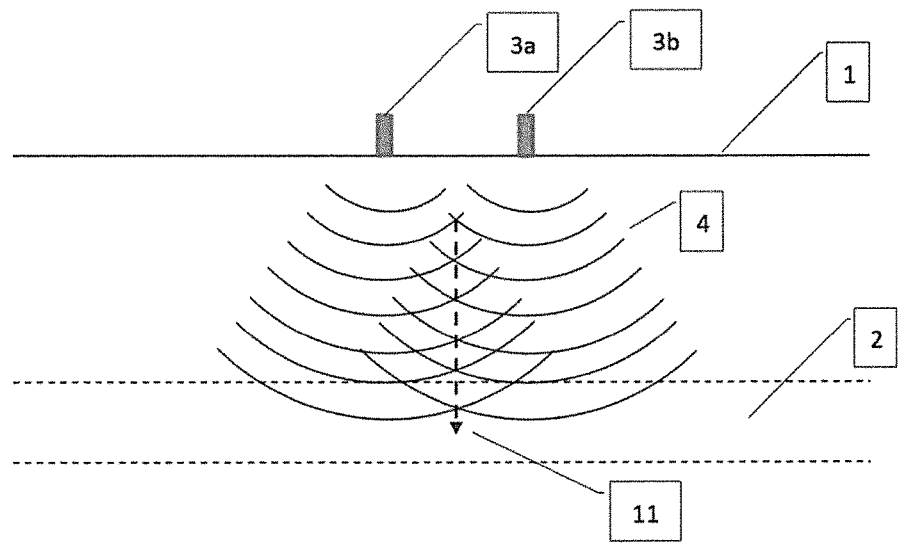
FIG. 5 contains another embodiment of the invention.

Seismic monitoring is known as a method with an observation horizon that penetrates far deeper into a hydrocarbon reservoir than any other method employed in the oilfield industry. In the case of certain reservoir formations an embodiment uses classical seismic signal generators that are typically used for seismic surveys (or other generators) from the surface or subsurface [1], to create a seismic shock wave propagating downward from the seismic signal generator [3] to the target formation [2] which then will induce incremental increased shear stresses to the high normal stresses already being applied during hydraulic fracturing. According to an embodiment, two or more seismic signal generators [3a, 3b] operating in a synchronized manner will be used to optimize the direction and magnitude of the seismic signals on the target section of the reservoir under stresses induced by hydraulic fracturing. Note that, as is explained more fully below, "synchronized" does not mean operating at the same frequency or frequencies, but refers instead to two or more seismic sources that operated according to the methods taught herein.

Note that for purposes of the instant disclosure, the term fracture should be understood to describe the mechanical discontinuity in the producing formation which is typically a 2-dimensional surface or zone of mechanical failure. The fracture may be naturally occurring and created by inherent stresses in the surrounding larger scale geology, or created during hydraulic fracturing operations.

Additionally, fracture orientation should be understood to describe the off axis angle from normal to the wellbore of the 2-dimensional fracture on both 1) the horizontal axis described herein as tilt, and 2) on the vertical axis herein described as azimuth.

A hydraulic fracture will typically propagate perpendicular to the least principle stress. In reservoirs deeper than approximately 1,000 feet, the least principal stress will likely be horizontal; thus, the natural fracture and hydraulic fracture planes will be vertical. The angle of the fracture plane off of vertical is defined as the tilt angle. The azimuth orientation of the vertical fracture depends on the azimuth of the minimum and maximum horizontal stresses. Typically horizontal wells are drilled in the axis of minimum horizontal stress so that natural and induced fracture planes are oriented perpendicular to the wellbore thus maximizing formation permeability towards the wellbore.

Fracture orientation can be measured, among others, using ultrasonic logs or studying core samples from the well. From this data the seismic sources can be positioned normal to the measured fracture azimuth, and distanced from each other to generate a combined wave that travels at an angle that matches the fracture tilt resulting in the combined wave plane which overlaps or is parallel to the fracture orientation.

Similarly, seismic sources can be positioned based on knowledge of stress fields in a reservoir which can be measured, for example, using pore pressures and gamma logs. It is possible to use Poisson's ratio (which may not be reliable in some instances) calculated from sonic logs, while the best mechanical property measurements comes from core samples. From this sort of data the seismic sources utilized herein can be positioned in line with the minimum horizontal stresses and distanced from each other to create a tilt in the resulting combined wave plane to be overlapping and/or parallel to the expected fracture orientation.

In conventional seismic monitoring of production, a seismic source [3], such as airguns, vibrators or explosives, is activated and generates sufficient acoustic energy to penetrate the deep into the earth to reservoir formation depths and reflect back to the surface where the energy is recorded. This is old and well known.

However, according to an embodiment of the invention, the same sources or other sources can be used in a different way to induce micro-seismic events and fracture slip in the reservoir formation. The generation of propagating seismic signals [4a, 4b] from multiple sources [3a, 3b] can be performed under number of different models starting with no calibration and sequencing the signals between the sources in different combinations. Alternatively, the sources may be calibrated first via classical seismic monitoring of reflected or refracted parts of the energy recorded by seismic receivers such as hydrophones and geophones to measure the speed of the propagated signal between the sources and the formation so that the subsequent seismic signals generated according to an embodiment will be delivered to the formation [2] to induce micro-seismic events and fracture slip. In some embodiments the seismic energy will be delivered at the same time on different vectors [9a, 9b] and combined into a higher amplitude single vector [10] to create new fractures and fracture slip for dislocations in pre-existing fractures and new fractures. Lastly, the measurements of formation rock mechanical properties collected from formation core or sidewall samples may be added to the modeling and calibration so that the vectors of combined generated seismic signals [10] are delivered to the formation in a way as to align with the known directional stresses in the formation so to optimize the directional incremental stresses for inducing new fractures and fracture slip for dislocations in preexisting fractures and new fractures of the formation.

Referring now in more detail to hydraulic fracturing operations, it is known that production or storage capacity of underground reservoirs can be improved using a procedure known as hydraulic fracturing. Hydraulic fracturing operations are, for example, commonly performed in formations where oil or gas cannot be easily or economically extracted from the earth from drilled and perforated wellbores alone.

These operations include the steps of pumping large amounts of fluid through a borehole to induce fractures in the reservoir formation, thereby creating pathways via which the oil and gas can flow more readily than prior to the fracturing. After a crack is generated, sand or some other proppant material is commonly injected into the crack, such that a crack is kept open even after release of the applied pressure. The particulate proppant provides a conductive pathway for the oil and gas to flow through the newly formed fracture into the main wellbore.

An embodiment of the invention, rather than depending on proppant to keep fractures open, will induce a fracture slip for permanent dislocation(s) across the face of the fracture to hold open the fracture after the pressures applied by hydraulic fracturing is relieved.

The hydraulic fracturing processes cannot be readily observed, since they are typically thousands of feet or meters below the surface of the earth. Therefore, members of the oil and gas industry have sought diagnostic methods to tell where the fractures are, how big the fractures are, how far they go and how high they grow. Recently, fracturing operations for gas shale formations occasionally use of micro-seismic monitoring to map the fractures induced by hydraulic fracturing. However, the mapping of the density and extent of new fractures of magnitudes on the order of −2 does not seem to be directly correlated to enhancing formation permeability and hydrocarbon production in the case of gas shale reservoirs. Note that the micro-seismic monitoring systems do not have the sensitivity to detect fracture slip creating the dislocations of existing fractures which is where the more significant permeability improvement is realized. For this reason it is more important to dislocate existing fractures in gas shale as compared to the creation of new fractures. An embodiment of the invention can be used to induce fracture slip (dislocations in existing formation fractures) in formations such as, but not limited to, gas shale or coal bed hydraulic fracturing operations.

Seismic sources were originally developed to generate a controlled pulse of seismic energy to perform both reflection and refraction seismic surveys. The simplest seismic source is an explosive, typically dynamite, or it can be a more sophisticated technology, such as a specialized air gun. Conventional seismic sources provide single pulses or continuous sweeps of energy. All types of seismic sources generate seismic waves, which can travel through water or layers of rocks. For seismic surveys the waves are reflected and refracted and are recorded by geophones or hydrophones. Seismic sources may be used to investigate shallow subsoil structure, for engineering site characterization, but for the purpose of the instant invention the waves need to reach deeper structures bearing petroleum or mineral deposits with greater energy than would conventionally be generated in a reflection seismic survey.

Seismic waves are mechanical perturbations that propagate through the Earth at a velocity determined by the acoustic impedance of the formation in which they travel. The acoustic (or seismic) impedance, Z, is defined by the equation:

$$Z=V\rho,$$

where V is the seismic wave velocity and $\rho$ is the density of the rock.

When a seismic wave travels through the Earth it will encounter an interface between two formations with different acoustic impedances, some of the wave energy will reflect off the interface and some will refract through the interface. The seismic reflection technique consists of generating seismic waves and measuring the time it takes for the waves to travel from the source, reflect off an interface and then be detected by an array of receivers (or geophones) at or near the surface. Knowing the travel times from the source to various receivers, and the velocity of the seismic waves, a geophysicist can then reconstruct the paths of the waves and construct an image of the layered formations. For embodiments of the methods taught herein, a seismic survey, either prior to or during the hydraulic fracturing operation, is not required, but may be useful to determine the rock layer interfaces allowing more accurate modelling for this method relating to where to best position the seismic sources in reference to each other and the target formation so as to maximize the signal strength and optimize the direction of the signal vector within the target formation in some embodiments.

This embodiment is not intended for generating and detecting the faint micro-seismic events or dislocation events which are induced during hydraulic fracturing operations. Apart from the problem of detecting the often faint micro-seismic events of magnitude −2 earthquakes, the strong seismic waves generated to induce fracturing and dislocations according to the invention would tend to mask the smaller signal generated by the faint and localized events. Also, the interpretation of micro-seismic signals can be difficult since normally in seismic surveys the source location, signature or characteristics are understood. It has also recently been theorized specifically for gas shale formations that the generation of new micro fractures may not add to permeability and production of hydrocarbons from the formation, but rather the dislocation of pre-existing fractures are the events which add significantly to permeability and production. A dislocation event of an existing fracture measured in microns of dislocation movement will have a lower magnitude signal than those created by new micro fractures during hydraulic fracturing.

Microseismic monitoring methods are old and well known in the art and can be found, for example, in the following publications, the disclosures of which are all fully incorporated by reference herein as if set out at this point:

Maxwell S. C., Urbancic T. I., Falls S. D., Zinno R.: "Real-time microseismic mapping of hydraulic fractures in Carthage", Texas, 70th Annual International Meeting, SEG, Expanded Abstracts, 1449-1452 (2000)

Phillips W. S., T. D. Fairbanks, J. T. Rutledge, D. W. Anderson: Induced microearthquake patterns and oil-producing fracture systems in the Austin chalk. Tectonophysics, 289, pp. 153-169 (1998)

Moriya, H., K. Nagano and H. Niitsuma: "Precise source location of AE doublets by spectral matrix analysis of the triaxial hodogram", Geophysics, 59, 36-45 (1994)

Pearson, C: "The relationship between microseismicity and high pore pressures during hydraulic stimulation experiments in low permeability granitic rocks", Journ. Of Geophys Res. 86 (B9), 7855-7864 (1981)

The present invention seeks to improve hydrocarbon production by inducing the dislocation of existing fractures and inducing new micro-seismic events in the formation using generated seismic waves during the hydraulic fracturing process.

An embodiment of the invention includes production of seismic waves generated by using a two or more signal sources [3a, 3b] to induce seismic slip. It is important for purposes of an embodiment that, as a specific example, when two sources are used that they be operating at slightly different frequencies. Continuing with the current example, depending on the depth of the formation, the distance between the sources, velocity of the subsurface, and other factors, operating one vibroseis or other source at a constant frequency of 0.999 Hz and another at 1.001 Hz would be a suitable in some embodiments to deliver energy to the reservoir fractures to induce fracture plane slip.

By way of general explanation, consider the case of a homogeneous subsurface. In that case, a seismic source will generate waves that expand spherically (actually hemispherically) downward and away from a surface source and into the half-space below it. A second surface source spaced apart from the first (again assuming homogeneity) will similarly expand spherically. Now, consider the intersection between a single source excitation (e.g., a spike) from the first source and a similar source excitation from the second source under the current model. At the location where the source excitations reach and pass through each other, there will be an expanding vertically oriented semicircular region where the two sources add constructively. The location of the point of intersection will be a function of the relative excitation times of the sources (e.g., if the second source is delayed relative to the first the point of intersection will be nearer the second source).

Continuing with the previous example, if each source is repeatedly activated at the same time spacing between excitations, say ΔT seconds apart, the target formation will be impacted by a constructively summed seismic wave at the points of intersection of the waves in the region. At these points there will be a maximum impact on the formation and its existing micro fractures from the combined sources. However, no matter how long the sources 3a and 3b continue to operate, the constructively summed seismic event will only impact the target formation at the regularly spaced and unchanging points of intersection. Therefore, the spacing between excitations should change periodically during the operation to reposition where the waves intersect within the stage being fractured to optimize slip of many fractures rather than a few. For example, shot pairs might be initiated with a timing offset to deliver the combined wave at one end of the stage being fractured. Operating at 1 Hz the sources deliver 600 shot pairs in 10 minutes. Then the timing offset can be changed slightly to move the combined wave towards the other end of the stage. Over four hours and 23 timing offset changes, the combined wave will finally be located at the other end of the stage being fractured. This is called a stepped sweep.

However, consider the example where the time separation between source excitations of source 3a is different from that of source 3b, with the source 3b being activated with the same starting timing offset but, rather than stepping the timing offset, the sources are operated at a slightly different frequency to create a continous sweep rather than a stepped sweep. In such a case, the locations where the summed seismic signal source impacts the target formation will tend to continously sweep over the formation. As a specific example, if source 1 has a base frequency of 0.999999 Hz and source 2 has a frequency of 1.000001 Hz, the two signals will add constructively at the target interface at intervals of less than one inch continuously over a 500 foot stage, given a depth of 8000 feet, a homogeneous velocity of 1800 ft/sec, and seperation between the sources of 3,450 feet.

As such, an embodiment of the invention utilizes at least two seismic sources that are activated at a constant frequency with the time separation between the two sources being only a few microseconds.

Figure 11:
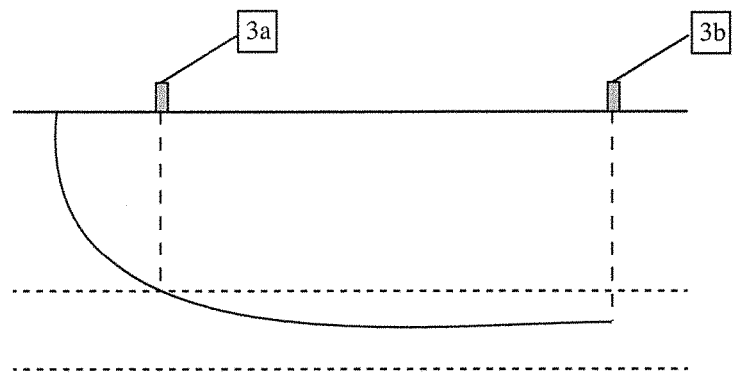
FIG. 11 contains a schematic illustration of acceptable locations for a two source embodiment of the invention according to one embodiment.

Another factor to consider is the impact of having one source begin before the other. In some embodiments this might be done to cause the subsurface "sweep"/movement of the location of constructive sum to move in a particular direction. For example, in the configuration of FIG. 11, if 3b begins first and 3a begins 1 second later, the sweep will move to the right.

Often the surface topology around the well site and the available easements accessible to seismic source generators will limit the vectors which can be delivered to the reservoir using a single or multiple seismic signal sources. Using synchronized seismic source generators within the boundaries of accessible sites overcomes the limitations to the direction and amplitude of seismic signal. Using this synchronized source generation approach a vertical plane [11] of combined seismic wave vectors can be swept using the time differential between signal source generators. This creates a sweeping seismic wave higher amplitude signal with variable combined vector directions [10]. Also, for reservoirs harder to induce fracture slip due to lower reservoir stresses and/or higher rock ductility using a multi-component signal generation scheme with multiple sources allows for delivery of a combined seismic signal of higher amplitude and on many different vector directions.

Important to this method is delivering a seismic wave with the energy to displace the rock at the form ation depth to induce slip of existing fractures and help create new fractures. Attenuation of the seismic wave will vary by source wave frequency, target formation depth and rock layers of varying properties between the surface and formation depth.

Seismic Source Energy of an Embodiment

There are many types of seismic sources. Though somewhat destructive in its own right, a thumper truck is far less environmentally devastating than dynamite, which, for some time, was the preferred method for the generation of seismic signal data. Dynamite is, by its nature, inherently dangerous to use. It is also ecologically devastating in that it necessitates the digging of "shot-holes" which are then expanded by the explosive into sizeable craters. This uncontrolled force can cause severe ecological damage over a much wider area than does a thumper truck. These vehicles maintain one further advantage over the use of dynamite in seismic data generation. They are a far less threatening exploration technique in areas of political instability than is any sort of explosive.

The thumper truck generates seismic data through a single impulse—the singular release of a falling or accelerated weight drop. On the other hand, vibroseis, a vehicle-mounted hydraulic vibrator, also known as a shaker unit, provides seismic signals over a longer time period, thus data is continuous as opposed to intermittent. Vibroseis vehicles are somewhat easier on the soil, as well. Specialized air guns and plasma sound sources (PSS), sometimes called spark gap sound sources, though less destructive than dynamite or a thumper truck, are not quite as accurate or as efficient.

For the case of weight drop systems, the energy E delivered to create the seismic wave can be calculated from Newton's Law as:

$$E = \frac{1}{2}mv^2 \text{ (half mass times velocity squared).}$$

For the largest available weight drop sources the energy E has been demonstrated to be as high as 45,000 kg*m²/sec². Of course, conventional pile drivers can provide even higher energy.

To calculate the energy transfer from the source to a seismic wave the common measure is energy density. For the largest accelerated weight drop systems the energy density ($E_k$) delivered to generate the seismic wave has been demonstrated to be 88 dB.

Using the maximum kinetic energy equation it is possible to calculate kinetic energy density $E_{kmax}$ for a seismic wave at peak amplitude $u_0$ assuming a homogeneous rock density $\rho$ and angular frequency $\omega$.

$$E_{kmax} = \frac{1}{2}\rho u_0^2 \omega^2$$

where $\omega = 2\pi f$.

Thus, solving for $u_0$ yields:

$$u_0 = \sqrt{E_{kmax}/2\pi^2 \rho f^2}$$

where $u_0$ is peak wave amplitude.

This is the wave amplitude; however, the seismic wave attenuates with distance z (depth). To calculate the displacement at formation depth the wave attenuation accumulated in reaching target depth of the section being hydraulically fractured must also be considered.

Displacement and Attenuation of Seismic Waves associated with an Embodiment

In the field of seismic surveying the terms typically considered most important are wave velocity, acoustic impedance and the density of rock for modeling depth and angles of the various layers of rock. However, for the method described for inducing fracture slip it is fundamentally important to optimize the displacement from the seismic waves generated with the seismic sources to deliver the necessary dislocation/stress to the formation being hydraulically fractured to induce dislocation of existing fractures and new micro-fractures.

It is well known that seismic waves decrease in amplitude as they propagate away from the source due to 1) spherical spreading of the wave (spherical divergence), 2) mechanical properties of the rock, and 3) other loss mechanisms in the rock. Also, attenuation of seismic waves is highly dependent on their frequency. Natural attenuation begins at about 4 Hz and increases dramatically going to just 10 Hz.

Experimentally it has been found that he attenuation depends on frequency and there is little dispersion. For the largest weight drop systems the wave can be modeled as a plane wave rather than a spherical wave applicable to a dynamite source. From this, a good approximation of attenuation without considering dispersion can be described by a plane wave model:

$$A = A_0 e^{-\left(\frac{fz}{\beta}\right)},$$

where A is amplitude, f is frequency, z is target depth, and $\beta$ is wave velocity.

Since displacement u is equal to 2*A it is possible to convert the equation to terms of displacement while also substituting $A_0$ with $u_0$ to determine displacement at formation depth z:

$$u_0 = \sqrt{E_{kmax}/2\pi^2 \rho f^2}$$

which is the initial displacement without attenuation. Thus, according to the current embodiment $$u_Z = \sqrt{E_{kmax}/2\pi^2 \rho f^2} * A_0 e^{-\left(\frac{fz}{\beta}\right)}$$

which is displacement considering attenuation, with z being the distance travelled from the source in meters and f being the frequency of the seismic source signal and $\beta$ is wave velocity. Using this equation the magnitude of displacement at formation depth can be shown to be in the range of 10's or 100's of microns for a typical target shale formation.

Note also that the attenuation difference from using a seismic wave at f=1 Hertz to f=10 Hertz will drive attenuation to reduce displacement to a small fraction of $u_0$. Therefore, to optimize the displacement and maintain most of the seismic wave energy for this method, seismic sources operating at lower frequency ranges from 0.1 to 4 Hertz should be used. This is different from the most common seismic sources used for surveys which are Vibroseis systems operating at higher frequencies.

Positioning of Multiple Seismic Sources According to an Embodiment

Figure 6:
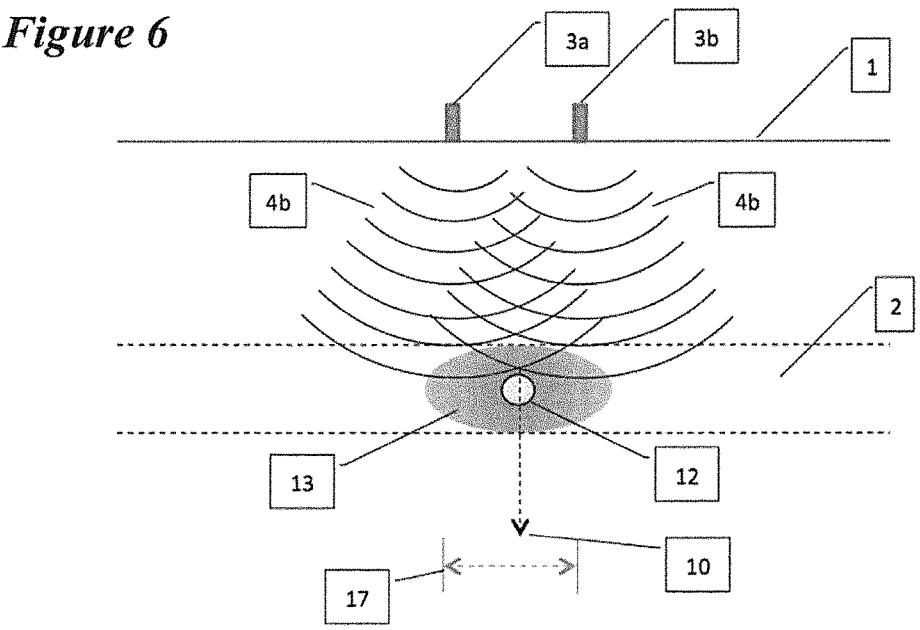
FIG. 6 contains still another embodiment of the invention.

The signals generated by the multiple sources are separated in distance and rotated in the time domain to effectively sweep a combined seismic signal vector through the reservoir [13]. A simple example of how this may be implemented between two sources as described in FIG. 6 by the following equations:

$D_1$=horizontal distance of signal source 1 from the horizontal wellbore [12].

$D_2$=horizontal distance of signal source 2 from the wellbore opposite side of source 1 at distance $D_1$.

$T'_0$=start time of first source signal from source 1

$T''_0$=start time of first source signal from source 2

$t_1$=time between seismic signals of source 1

$t_2$=time between seismic signals of source 2

$n_1$=number of seismic signals generated from source 1

$n_2$=number of seismic signals generated from source 2

$D_W$=average depth of the horizontal wellbore of the section being hydraulically fractured $S_R$=distance of seismic vector vertical plane sweep on either side of well bore ($2*S_R$ represents total sweep [17])

V=seismic wave velocity, is assumed constant for all seismic wave paths in this example for simplicity.

$T'_n - T'_0$=is the duration of the time between the first and last seismic source wave generated and the time during which maximum hydraulic fracture pressure is held on the formation while seismic signals are generated to induce slip in existing fractures.

N=the maximum number of seismic signals generated by the seismic sources chosen in a duration of time.

where:

$T'_0 < T''_0$, source 1 starts first seismic signal before source 2.

$n_1 = n_2$, each source generates the same number of seismic waves while source 1 starts first seismic signal and source 1 delivers the last.

Thus:

$T''_0 - T'_0 = ((D_W^2 + (D_1 + S_R)^2)^{1/2} - (D_W^2 + (D_2 - S_R)^2)^{1/2})/V$, at start of operation Also:

$T'_n - T''_n = ((D_W^2 + (D_1 - S_R)^2)^{1/2} - (D_W^2 + (D_2 + S_R)^2)^{1/2})/V$, at end of operation $N*(T'_n - T'_0) > n_1$ and $N*(T''_n - T''_0) > n_2$, so that signal generation from any source is not delayed to go out of synchronization with other sources.

$t_1 = (T'_n - T'_0)/n_1$ $t_2 = (T''_n - T''_0)/n_2$ $t_2 < t_1$ and will sweep the intersection plane of the two seismic source waves from a distance of $S_R$ from one side of the wellbore to the other side of the wellbore also to distance $S_R$ for a total sweep distance of $2*S_R$ [17].

The "two seismic source" model above assumes the elevation of the two sources in reference to the horizontal wellbore is the same ($D_W$). The equations can be modified to take different source elevations into account.

The "two seismic source" model above will also work for sources not aligned orthogonally to the horizontal well bore. In such cases the sweep range $S_R$ can be set longer to be sure to sweep the full length of the section of the reservoir being hydraulically fractured.

Figure 7A:
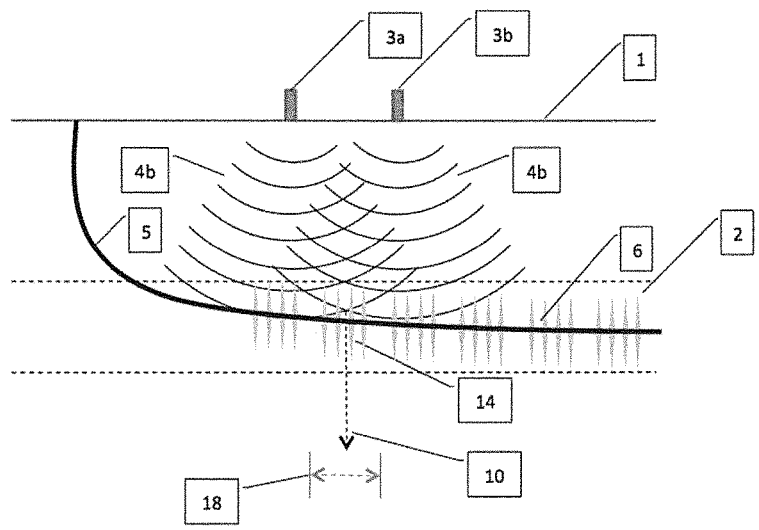
FIG. 7a illustrates a further embodiment of the invention.
Figure 7B:
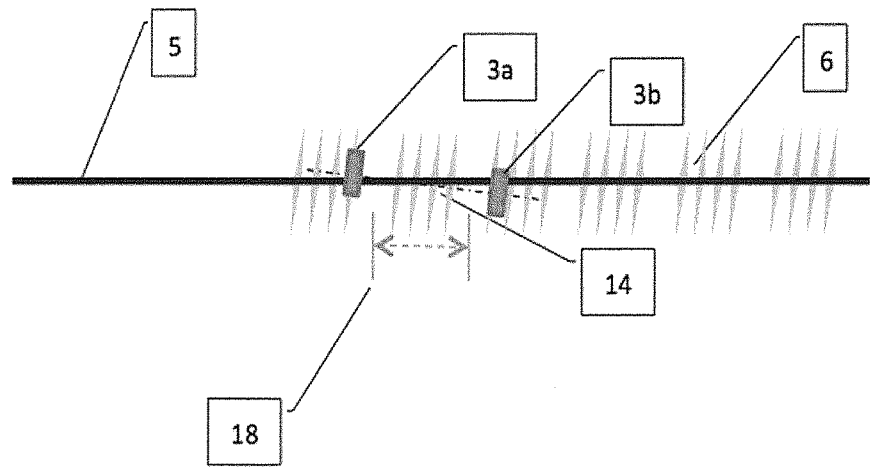

Another configuration for a "two seismic source" model is to align the two sources with the horizontal wellbore [5] at positioned above (or near to) either end of the section to be fractured [14] as shown in FIG. 7a. Alternatively, FIG. 7b illustrates a plan view example which shows how fractures may not be perpendicular to the wellbore and thus the two seismic sources will preferably be oriented along a line that is perpendicular to the azimuth of the fracture plane instead of perpendicular to the wellbore. In these cases the definitions of the terms modify slightly as below but fundamentally the equations still hold true:

$D_1$=position of signal source 1 above the horizontal well bore measured from the starting end of the section to be fractured.

$D_2$=position of signal source 2 above the horizontal well bore measured from the far end of the section to be fractured.

$T'_0$=start time of first source signal from source 1

$T''_0$=tart time of first source signal from source 2

$t_1$=time between seismic signals of source 1

$t_2$=time between seismic signals of source 2

$n_1$=number of seismic signals generated from source 1

$n_2$=number of seismic signals generated from source 2

$D_W$=average depth of the horizontal wellbore of the section being hydraulically fractured $S_0$=wellbore depth of ell bore at the near end of the section being hydraulically fractured.

$S_1$=wellbore depth of well bore at the far end of the section being hydraulically fractured.

The vertical combined vector plane sweep distance according to this example is ($S_R - S_0$) illustrated by [18].

V=seismic wave velocity, is assumed constant for all seismic wave paths in this example for simplicity. For calculating V for a layered formations of different velocities, $$V = \sum_{k=0}^{n} V_k * \frac{x_k}{\sum_{i=0}^{n} x_i}$$

where $x_k$ is the thickness of each layer and $V_k$ is the velocity within each layer.

$T_n - T'_0$=is the duration of the time between the first and last seismic source wave generated and the duration which maximum hydraulic fracture pressure is held on the formation while seismic signals are generated to induce slip in existing fractures.

N=the maximum number of seismic signals generated by the source in a duration of time, where:

$T'_0 < T''_0$, source 1 starts first seismic signal before source 2.

$n_1 = n_2$, each source generates the same number of seismic waves while source 1 starts first seismic signal and source 1 delivers the last.

Thus:
$T''_0 - T'_0 = ((D_W^2 + (D_1 - S_R)^2)^{1/2} - (D_W^2 + (D_2 - S_R)^2)^{1/2})/V$, at end of operation Also:
$T'_n - T''_n = ((D_w^2 + (D_1 - S_0)^2)^{1/2} - (D_W^2 + (D_2 - S_0)^2)^{1/2})/V$, at end of operation $N*(T'_n - T'_0) > n_1$ and $N*(T''_n - T''_0) > n_2$, so that signal generation from any source is not delayed to go out of synchronization with other sources.

$t_1 = (T'_n - T'_0)/n_1$
$t_2 = (T''_n - T''_0)/n_2$

According to this example, $t_2 < t_1$ and will sweep the intersection plane of the two seismic source waves for a distance of $S_R - S_0$ from one end of the section being fractured to the other end [18].

As a specific example of how the foregoing computations might be performed in practice, consider the following example. Assume the parameter values given below:

| Input Parameters | |
|---|---|
| Frac pump time at max pressure | 4 hours |
| $D_1$ - Position of Source 1 | 13550 feet |
| $D_2$ - Position of Source 2 | 17000 feet |
| $T'_0$ - start time for Source 1 | 0.0 sec |
| N (base frequency) | 0.5 Hz |
| Dw - Average vertical depth to stage | 8000 feet |
| V - Seismic wave velocity thru strata | 1800 ft/sec |
| $S_0$ - start of stage | 15250 feet |
| $S_R$ - end of stage | 15750 feet |

Then, according to the equations set out above, the following values may be calculated:

| Results | |
|---|---|
| $t_1$ - period of Source 1 | 2.000000000 sec |
| $t_2$ - period of Source 2 | 2.000016239 sec |
| $T''_0$ starts before $T'_0$ by | 0.11 sec |
| $n_1$ - number of Source 1 cycles | 7200 |
| $n_2$ - number of Source 2 cycles | 7201 |
| Sweeping plane increments | 0.83 inches |
| $T'_0 - T''_0 =$ | 0.11 sec |
| | 1.28549E-06 hours |
| $T''_n - T'_n =$ | 0.01 sec |
| | 6.77661E-08 hours |
| Tilt of Sweep at $S_R$ | 6.5 degrees |
| Tilt of Sweep at $S_0$ | -0.3 degrees |
| Avg. Tilt through Sweep | 3.1 degrees |
| $f_1$ - frequency of Source 1 | 0.50000000 Hz |
| $f_2$ - frequency of Source 2 | 0.49999594 Hz |

The two seismic source model can also be expanded to more sources if the ground topography and easements for access around the well site allows. Rather than a single pair of synchronized seismic sources, multiple pairs can be used to increase the amplitude of seismic waves and add more seismic wave vector directions. Similar to the single pair, each additional pair would have its own calculated synchronized $t_1$ and $t_2$. A pair would be synchronized to a neighboring pair of sources using the same approach within each pair. Offsetting the start of T"a and T"b between adjacent pair or on the diagonal pairing offset of T"a and T'b generates a synchronized sweep of combined seismic wave vectors that move along the horizontal wellbore from the deeper end to the shallower end (or vice versa) of the horizontal section being hydraulically fractured. This single pair and multiple pair example generate multiple seismic wave vector directions so that these different vectors align to stress directions in the reservoir to induce fracture slip and dislocation.

A more complex approach may use pre-existing seismic data to determine fold directions and angle in the reservoir section to be hydraulic fractured. Knowing this will make it possible to construct a set of equations to determine the placement of a single or multiple seismic source generators to create a single or combined set of seismic waves with vectors most suited to promote slip in pre-existing fractures during hydraulic fracturing. It is advantageous to align seismic wave vectors to dip, rake and strike angles of pre-existing reservoir fractures to promote dislocation and slip.

Aligning seismic signal vectors may not be possible in some cases when positioning options for pairs of seismic source generators is limited. However, it is possible to calculate the optimum position of a pair of seismic signal generators. Wave reflection prior to reaching the formation being fractured does not need to be considered in the vector direction calculation, but will decrease seismic wave strength reaching the formation. Refraction may be considered in this calculation, although one would normally expect refraction to be small since the signal source generators need to be positioned nearly directly normal above well bore to minimize the distance the seismic wave travels to therefore maximize signal strength. Also, a pair of seismic source generators targeting a segment of the well will be propagating their respective wave downward through similar layers and thus reflection and refraction can be assumed to be similar.

Snell's equations are used to calculate the refraction of a seismic wave at a density change interface. The ratio of the sine's of the angles of incidence θ and refraction is equivalent to the ratio of phase velocities v of the two different media, or equivalent to the reciprocal of the ratio of the indices of refraction n.

$$\frac{\sin\theta_1}{\sin\theta_2} = \frac{v_1}{v_2} = \frac{n_1}{n_2}$$

For this method of inducing fracture dislocation, the initial angle of propagation $\theta_1$ approaches zero since the seismic sources are placed nearly directly above the wellbore in the target formation, therefore $\theta_2$ is also small in this application.

Also, since a goal is to maximize the seismic wave at the reservoir it is best to position the seismic source generators as close to the normal angle of incidence above the horizontal well bore while separating them enough to sweep the seismic waves through the reservoir around the well bore.

In some cases neighboring wells will be hydraulically fractured in the same operation, i.e., a multi-well hydraulic fracture operation might be conducted. Multi-well fracture operations typically include two or more parallel well horizontal laterals with alternating perforation intervals. In one scenario the hydraulic fracture pumping operation alternates between these wells by stage in what is called "zipper fracs". In this case new fractures may overlap and even interconnect between wells. In another case, called "simul-fracs", the frac pressure is held on one well stage or stages while the other well stage is hydraulically fractured which leads to a stress pattern in the formation around the pressurized well keeping new fractures from propagating and connecting between wells. In both of these cases the method described can be applied to induce dislocation of existing fractures and create new fractures using a single or plurality of seismic source generators positioned above multiple horizontal wells.

Compression and Shear Wave Combined Wave Planes associated with an Embodiment

The discussions above have not mentioned the different seismic wave types called compression waves (P-wave) and shear wave (S-wave). The equations above apply to both. Generally speaking shear waves travel at less velocity than compression waves.

Compression (P) wave velocity is described by:

$$V_p = \sqrt{\frac{\lambda + 2\mu}{\rho}}$$

Where ρ is density and λ and μ are Lame parameters representing incompressibility (λ) and rigidity (μ). Shear (S) wave velocity is described by:

$$V_s = \sqrt{\frac{\mu}{\rho}}$$

Figure 9:
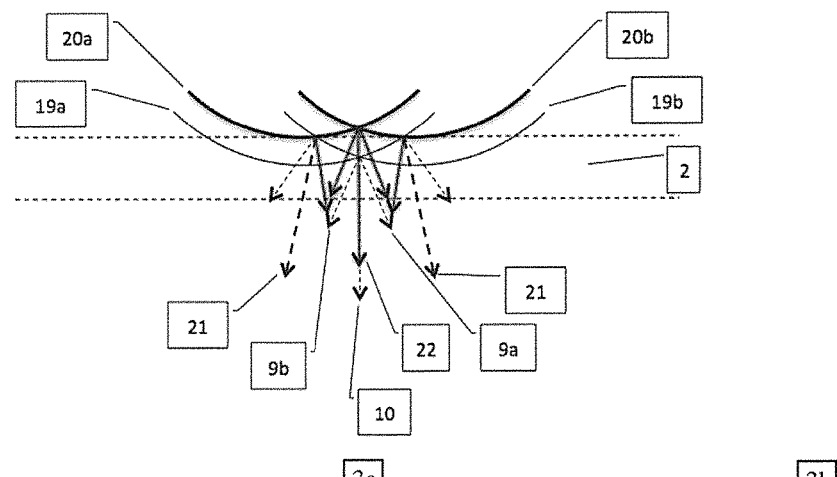
FIG. 9 shows still another embodiment.

Considering this for seismic sources generating both compression waves [19a, 19b] and shear waves [20a, 20b], the sources will deliver multiple parallel planes of combined waveforms staggered in space by the velocity differences of the combined wave vectors, FIG. 9. The vertical plane of combined compression waves [11] is accompanied by additional combinations in a two source model. These additional parallel combined wave planes are the combination of P-wave from source 1 [19a] with S-wave from source 2 [20b], S-wave from source 1 [20a] with P-wave from source 2 [19b], and S-wave from source 1 [20a] with S-wave from source 2 [20b]. One benefit from such a combination of wave planes is the displacement directions of the wave planes are different between common wave planes (P-wave and P-wave [10], and S-wave and S-wave [22]) compared to the P and S wave combined planes [21] the displacement varies direction as the wave propagates, thus delivering a plurality of displacement directions in a sweep through the formation during hydraulic fracturing.

For this embodiment the combination of shear and displacement directions of both separate and intersecting compression and shear waves enhance the degree of fracture dislocation and are desired. This is different from seismic surveys where the difference in speed and attenuation of compression versus shear waves are used in seismic signal processing to further enhance the seismic survey analysis and results. Frictional sliding on a plane will occur when the ratio of shear to no inial stresses reaches the coefficient of friction, also known as Amonton's Law:

$$\mu = \frac{\tau}{\sigma_n},$$

where τ is shear stress, $\sigma_n$ is normal stress, and μ is the coefficient of friction of a pre-existing fracture. Therefore, hydraulic fracture operations may induce fault slip in new or pre-existing fractures if the normal stress in the fracture plane is reduced enough so that $$\frac{\tau}{\sigma_n}$$

exceeds μ. However, the method described herein increases the shear stress (τ) by delivering seismic waves to the formation under hydraulic pressure during fracking operations to further overcome the coefficient of friction and induce more fracture dislocation.

Geomechanics of an Embodiment

Figure 8:
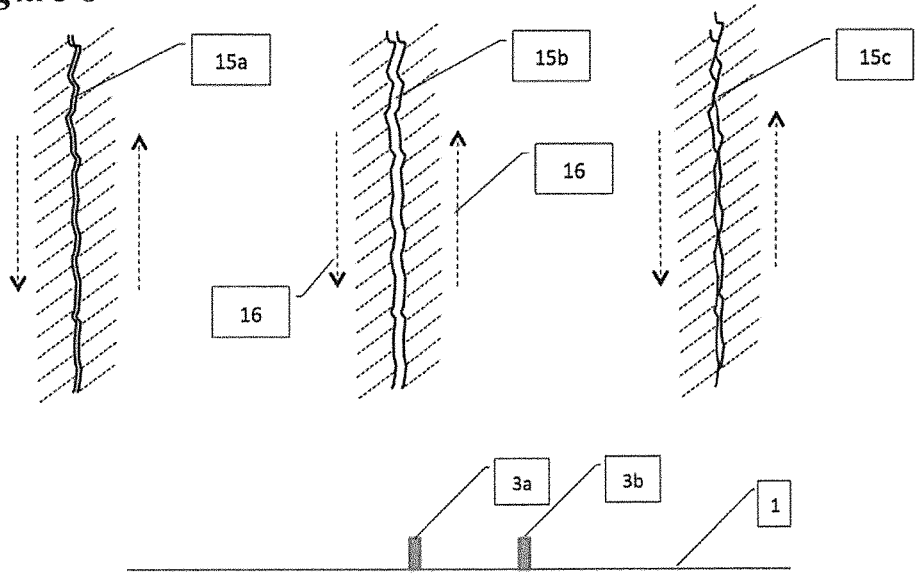
FIG. 8 contains a schematic illustration of micro fractures in the subsurface according to an embodiment.

As the pressure applied to the formation increases at the start of hydraulic fracturing operation the formation rock first undergoes elastic deformation. At some higher pressure the rock then begins to yield and deform. This is characterized by the rock's ductility; the property describing plastic deformation under stress without fracture. At even higher hydraulic pressure the stress exceeds the ultimate tensile strength of the rock and a fracture is created. Brittleness is the tendency to fracture upon the application of a stress. Rock which is considered to be very ductile has a low Young's modulus and a high Poisson's ratio. Under such conditions it may be difficult to fracture the rock as it just deforms under high stresses. This is particularly true for shale rock with high clay content. Rock which is considered to be very brittle has a moderate to high Young's modulus and a low Poisson's ratio. Under this condition the rock will fracture but without much if any deformation leading to the fractures to close tightly after hydraulic fracturing pressure is removed. Historically, proppants have been used to help hold the fractures open as hydraulic fracturing pressure is removed; however, in many rock types such as shale rock, adding proppant has often led to negative effects such as plugging the fractures resulting in lower hydrocarbon production. The method described minimizes this risk since it causes a dislocation of the fracture, FIG. 8.

Pre-existing fractures also exist in the formation. As pressure is applied by hydraulic fracturing the pre-existing fractures will tend to open and then extend in reach as higher pressures are reached. Embodiments of the methods described herein deliver additional stresses to the rock with seismic waves to induce additional fractures, but also the method delivers a plurality of seismic waves with displacements on the order of 10 to 100 microns which induce dislocations in both new and pre-existing fractures. These dislocations are important to improve the permeability of the formation and improve the production of hydrocarbons. The implementation of the method described can increase the formation permeability in conjunction with hydraulic fracturing to further improve hydrocarbon production.

Optimization of Seismic Source Generator

According to an embodiment, a vibratory seismic source generator for an inventive method of creating fracture dislocation has different signal characteristics from those traditionally used as seismic sources in geophysical exploration. The differences include magnitude and frequency of seismic signal generated and a focus on directing the signal on a single downward vector with minimal surface wave generation. Additionally, seismic sources for seismic surveys must be designed so the source has no recoil which may generate unwanted secondary signals creating a noisy source signal. For creating fracture dislocation with a seismic source this recoil or secondary signal is not a concern.

Vibroseis vibrators are the most widely used seismic sources today for land seismic mapping and conventionally generates a low magnitude high frequency signal. This approach is not effective for creating fracture dislocation at depth since the signal energy has low magnitude and the high frequency signal has significant attenuation as it propagates deeper into the earth. In short, the resulting energy delivered to the formation being hydraulically fractured is not enough to cause fractures to slip and dislocate at depth. The optimum seismic source generator for this method of creating fracture dislocations creates a high magnitude low frequency signal in order to maximize the energy delivered from the source the formation being hydraulically fractured. Low frequency signals ranging from 0.1 Hz to 5 Hz have much less attenuation compared to the higher frequencies used in vibroseis and therefore can deliver more energy to the formation being hydraulically fractured. As such, for purposes of the instant disclosure the term "low frequency" will mean frequencies between about 0.1 Hz and 5 Hz according to some embodiments. More particularly, according to another example the term "low frequency" will apply to any frequency less than about 5 Hz.

Additionally, seismic sources used today for seismic mapping are often not configured to minimize the generation of surface generated waves that are produced as a byproduct of generating a seismic signal. Post-acquisition seismic signal processing algorithms can usually simply filter out and/or mute the noise from surface wave signals in order to enhance the resolution of seismic mapping. Thus, reduction of surface waves is not a primary concern during data acquisition.

However, surface waves represent lost energy that would preferably be directed downward toward the target formation. Therefore, preferably a seismic signal source that is utilized according to the instant methods should have a ground contact (foot) that is configured as much as possible to direct the seismic signal downward in a single vector. Thus, the foot configuration of the source where it is in contact with the earth should be configured to minimize surface waves to maximize the energy delivered in a downward directed vector.

Today, the foot configurations of seismic sources such as Vibroseis or Accelerated Weight Drop (AWD) use circular or square flat plate configurations. These systems are often used on paved or dirt roadways during a seismic survey. Flat footplates used for seismic surveys minimize damage to the roadway and are operable at low magnitude. However, these sorts of common foot configurations are not best for the methods taught herein as they tend to create excessive surface waves with associated energy loss. As such, foot configurations that would be more useful in connection with the methods taught herein would be those that are designed to minimize the creation of surface waves and that are specifically adapted to be utilized with the surface layer of soil or material. The design of foot plates for the methods taught herein does not necessarily need to be constrained by the requirement that roadway damage be minimized as these sorts of sources will be placed above and most often along the horizontal lateral wellbore being hydraulically fractured. In many instances that would cause them to be situated in an open field and much less often on a roadway.

To reduce surface wave creation for certain embodiments, a foot configuration will be utilized that has a concave shape to minimize the lateral displacement of soil as the foot impacts the soil since lateral displacement during compression of the soil will cause a surface wave. The foot might be symmetrical around the vertical vector of force applied by the seismic source and it might be spherically concave, concave in a parabolic shape, or some other symmetric concave design. If the surface soil is soft and homogeneous (e.g. such as might be found in cultivated land), then a foot configuration that utilizes an external sleeve around the foot could provide a leading edge around the soil compressed to constrain lateral soil displacement and prevent surface wave generation.

Validation of Fracture Dislocation during Hydraulic Fracture Operations

Existing well monitoring practices today provide a method whereby the creation of fracture dislocations using this method can be validated. The simplest and most accurate validation method would use fluid flowback monitoring of volume and pressure after reaching peak hydraulic fracture pressures. This practice is already used today in hydraulic fracture operations. The pressure versus volume profile is a well know method to identify the pressure at which hydraulic fractures close indicated by a sharp reduction of fluid volume flowback. At any individual stage, or multiple stages, or during all stages of a wellbore being hydraulically fractured a "reference" hydraulic fracture cycle without seismic source generators in operation may proceed the final hydraulic fracturing with seismic source generators operating. Fracture dislocations induced by the seismic signal generators are verified by a reduction in the fracture closure pressure in comparison to the "reference" fracture closure pressure. A dimensionless measure of the effectiveness of seismic induced fractures can be represented by:

$$\varepsilon = \frac{(P_R - P_F)}{(P_S - P_F)}$$

Where:
Efficiency of Induced Fracture Dislocations=$\varepsilon$,
Reference Fracture Closure Pressure=$P_R$,
Post Seismic Dislocation Fracture Closure Pressure=$P_S$, and,
Static Formation Pressure=$P_F$.

This measure of dislocation effectiveness can be correlated closely to variations in production rates and recoverable hydrocarbons between stages in the same wellbore, or between wells producing from the same formation.

Seismic source position and fracture dislocation efficiency

For certain embodiments when using multiple seismic source generators it will be beneficial to consider the direction of predicted fracture planes in the formation that will be hydraulically fractured. By aligning synchronized pairs of seismic source generators so their combined signal vector plane is parallel the formations predicted fracture plane, then the optimum shear and displacement energy will be oriented to the fracture planes for more effective inducement of dislocations in those fracture planes. It is well known that fractures created during hydraulic fracture operations generally propagate radially from a horizontal wellbore in a vertical or nearly vertical plane dependent on the degree of slips and folds in the surrounding geology. By rotationally orienting pairs of synchronized seismic source generators with their connecting axis perpendicular to the predicted vertical fracture planes of the formation, the optimum dislocation efficiency would be expected.

Figure 10:
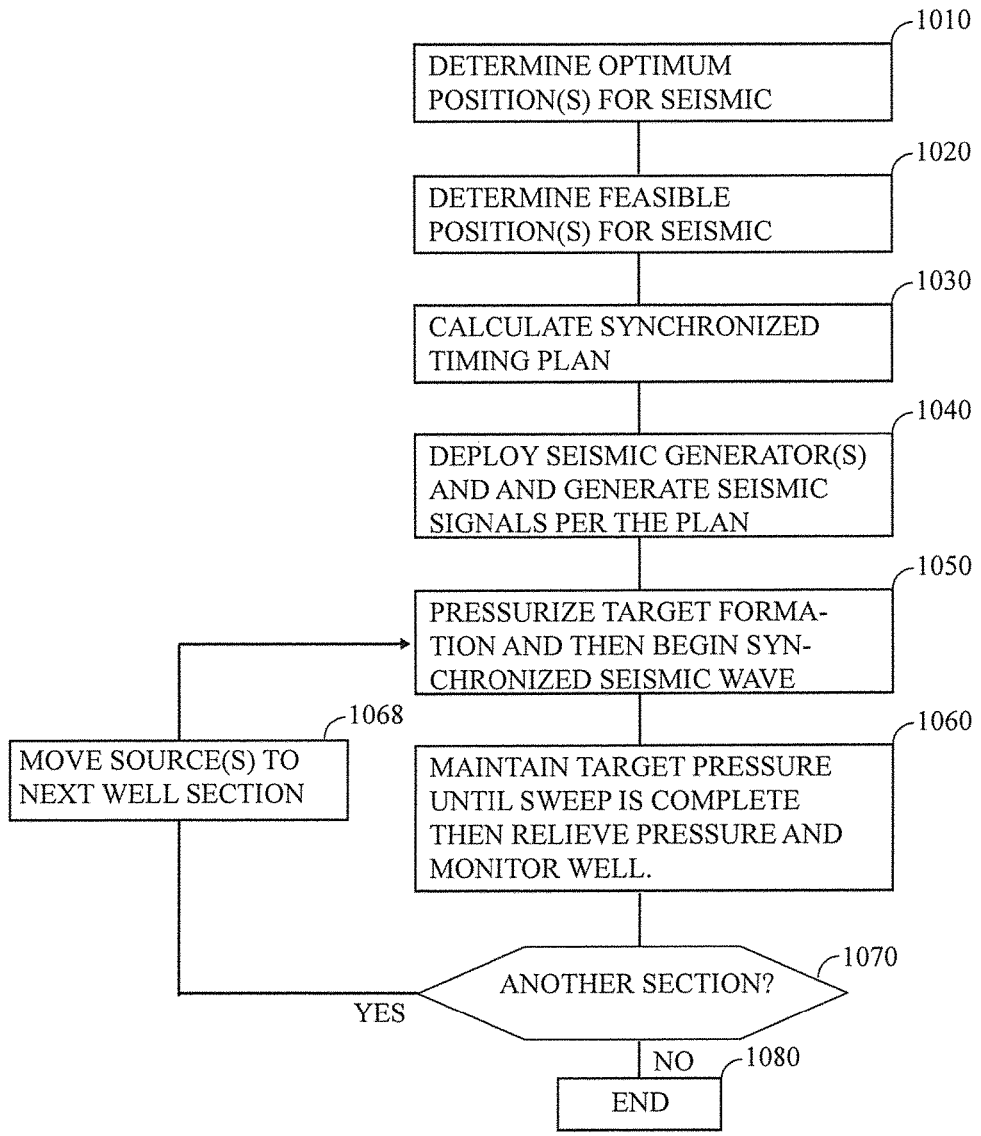
FIG. 10 contains an operating logic suitable for use with an embodiment.
Figure 12:
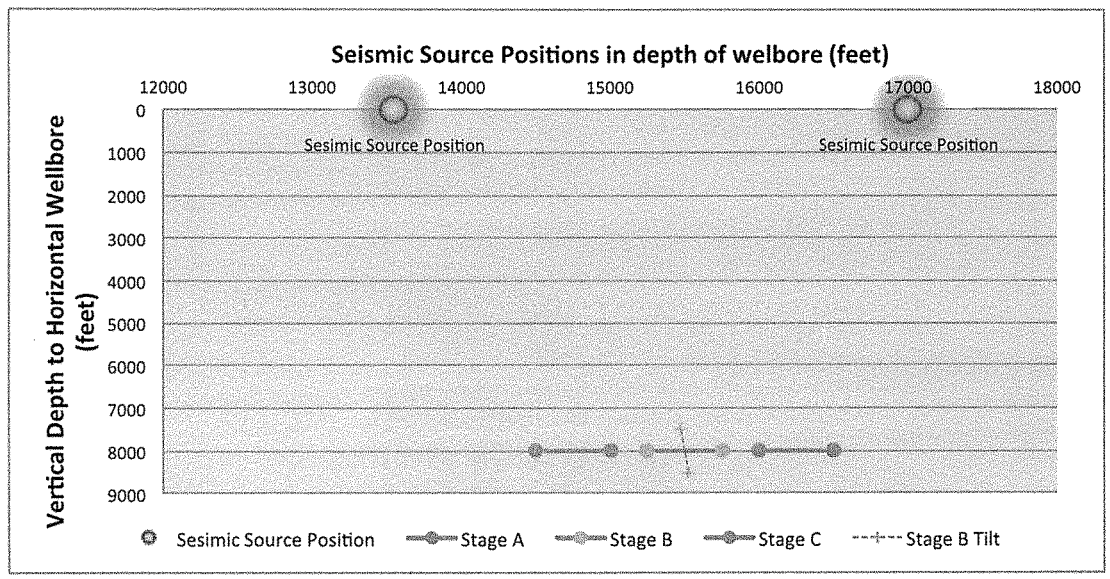
FIG. 12 shows seismic source positions with wellbore depth.

Turning next to the exemplary embodiment of an operating logic in FIG. 10, there is provided a methodology suitable for use with the instant invention. With respect to box 1010, optimum positions for seismic source generators in reference to each well section to be hydraulic fractured will be determined in consideration of existing and/or expected fracture directions. In some embodiments, those positions will be determined according to the equations set out above. Generally speaking, acceptable locations for a two-source configuration would be to position one source proximate to the location where a horizontal well penetrates the target formation and/or another near the terminus of the well (e.g., FIG. 11). That being said, it should be noted that whenever the term "optimum" is used herein that term will be construed to mean determining the positions of the seismic source generators and their timing at least approximately according to the methods set out herein.

With respect to box 1020, the positions of one, or multiple, source generators will be mapped so as to provide seismic waves that target each section that is to be hydraulically fractured, keeping each location as close as possible to the calculated optimum position while staying within accessible easements and keep sources close as possible to the section to be fractured. The term "feasible positions", of course, reflects the reality of seismic operations where existing structures, roads, pipelines, etc., might require the sources to be moved away from their intended positions.

With respect to box 1030, given the position of the source generators in reference to the well bore section to be hydraulically fractured, the synchronized timing plan can be calculated for seismic wave source generation between source generators for each well section to be hydraulically fractured so that the seismic wave is swept from one end of the well section to the other end of the well section or at some other preferred sweep direction.

More particularly, in some embodiments the seismic waves generated by embodiments of the invention will tend to sweep through the subsurface that lies beneath the straight line defined by the two sources. Thus, it will generally be preferred to position each source along the well bore where that is possible.

Of importance for some embodiments is a requirement that the sources be operating at low frequencies and that the sources only slightly differ in frequency. In some embodiments, and preferably, the two sources will operate simultaneously at low frequencies with each being at frequencies that differ by approximately 0.01 Hz or less. Some embodiments might utilize frequencies that differ by 0.001 Hz or less. In some cases the difference might be as large as 0.2 Hz.

Note that when it is said herein that the two sources operate at slightly different frequencies or that one frequency differs from the other by some small amount, that statement should be broadly construed to include cases where one source operates at a frequency that is slightly different from an integer multiple of the other. For example, if one source operates at 1 Hz and another operates at 2.0002 Hz, effectively the combined sources may be viewed as operating at 1 Hz and 1.0002 Hz with the faster source adding an unaccompanied "beat" or source excitation between each of the 1 Hz source excitations. Mathematically, if $\Delta F$ is the frequency differential, then this same analysis would apply to any case where one source operates at a base frequency of F hertz and the other source operates at a frequency of N*F+$\Delta F$ hertz, where N is a positive integer greater than or equal to 1. Thus, for purposes of the claims below when it is said that one source differs from another in frequency by a small amount, that language should be construed to include instances where the frequencies have the relationship described in this paragraph.

Further, it is critical that the two (or more) sources operate simultaneously at a spaced apart location proximate to a well bore and that during the time they are operating their current frequencies should differ by ΔF.

With respect to box 1040, seismic source generators will be deployed to well site and follow the positioning plan as much as possible. As discussed previously, it is contemplated that the sources be positioned proximate to a horizontal well bore, preferably one located near where the well penetrates the producing horizon and the other near the terminus of the well.

With respect to box 1050, for the first well section hydraulically fractured after the hydraulic fracture pressure reaches its target maximum then the synchronized seismic wave generation with the positioned seismic source generators should be initiated.

With respect to box 1060, hydraulic fracture pressure will be kept at the maximum target pressure until the seismic wave sweep is complete for each well section. Once complete, the hydraulic pressure will be relieved, the fluid volume return will be monitored, and the source generators will be moved to next positions for the next well section fracturing operation. With respect to box 1070, steps 1060 and 1060 will be repeated for each well section to be hydraulically fractured until all sections have been fractured.

It should be noted that, although the examples given herein were illustrated in terms of surface land seismic sources, subsurface sources could be used as well, as could vibratory marine sources. Those of ordinary skill in the art will understand how the methods taught herein could be adapted to such alternative scenarios.

Note that the word "terminus" as used herein with respect to a particular well bore might mean the actual physical terminus in the subsurface within the producing formation. It should also be broadly construed to include sections or ends of sections (or stages) of a well bore that have been perforated or otherwise configured so as to allow formation fluids to flow therein.

Further, although various aspects of the instant invention are discussed with respect to the use of a vibroseis signal generator, other sorts of signal generators might use as well including, for example, accelerated weight drops, pile drivers, etc., could be used in pairs or in combination with other sources. For purposes of the instant disclosure, the term "vibratory source" will be used to describe any of the foregoing or any other seismic source that can generate a signal at a predetermined frequency according to the invention. As additional examples, other sources might include explosives, air guns, plasma sound source, simple gravity weight drop systems, accelerated weight drop (AWD) thumper trucks, high altitude weight drops (HAWD), seismic vibrators (vibroseis), noise sources, boomer sources, counter rotating shaker sources, ground penetrating radar sources, electromagnetic sources, magnetometer sources, and downhole hydraulic and electromechanical rotary sources.

Finally, those of ordinary skill in the art will recognize that more than two sources could readily be used. In such a case, one method of analyzing the impact of multiple sources would be to take them in pairs and analyze the sweep that occurs along the line that connects each pair. In that way arbitrarily large number of sources may be combined according to the instant invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of inducing fractures or fracture dislocations in a subsurface formation being hydraulically fractured that contains a well bore therein, comprising the steps of:
   (a) determining a first location on the surface of the earth of a first vibratory seismic source proximate to a first point of said well bore;
   (b) determining a second location on the surface of the earth of a second vibratory seismic source along said well bore and spaced apart from said first vibratory seismic source;
   (c) positioning said first vibratory seismic source at said first location and said second vibratory seismic source at said second location;
   (d) selecting a first vibratory frequency less than 5 Hz for said first seismic source;
   (e) selecting a second vibratory frequency for said second seismic source different from said first vibratory frequency by an amount greater than 0.0 Hz and less than 0.2 Hz;
   (f) applying hydraulic fracking pressure to said well bore; and,
   (g) simultaneously operating said first seismic source and said second seismic source at said selected first and second vibratory frequencies respectively while said hydraulic fracking pressure is being applied, thereby creating a sweep of constructive interfering seismic signals along at least a portion of said subsurface formation, thereby inducing fractures or fracture dislocations in said subsurface formation.

2. The method of claim 1, wherein said first and second vibratory seismic sources are both selected from a group consisting of a vibroseis vibrator, a weight drop source, an accelerated weight drop source, and a pile driver source.

3. The method of claim 1, wherein said first and second vibratory frequencies differ by an amount greater than 0.0 Hz and less than or equal to 0.01 Hz.

4. The method of claim 1, wherein step (g) is performed a plurality of different times.

5. The method of Claim. 1, wherein step (g) is performed a plurality of different times at two or more different first vibratory frequencies.

6. The method of claim 1, wherein the well bore is horizontal.

7. A method of inducing fractures in a subsurface formation that contains a well bore, comprising the steps of:
   (a) determining a dominant fracture azimuth in said subsurface formation;
   (b) determining a first location of a first vibratory seismic source proximate to a first terminus of said well bore;
   (c) using said dominant fraction azimuth to determine a second location of a second vibratory seismic source spaced apart from said first seismic source, said first and second locations being situated such that a line drawn through said first and second locations is approximately perpendicular to said fracture azimuth;
   (d) positioning said first vibratory seismic source proximate to said first location and said second vibratory seismic source proximate to said second location;
   (e) selecting a first vibratory frequency less than 5 Hz for said first seismic source;
   (f) selecting a second vibratory frequency for said second seismic source, said second seismic source vibratory frequency being different from said vibratory frequency of said first seismic source by an amount greater than 0 Hz and less than or equal to 0.2 Hz;
   (g) pressuring said well bore;
   (h) activating said first vibratory seismic source at said first selected frequency; and,
   (i) while said first vibratory seismic source is activated, activating said second seismic source at said second selected frequency, thereby creating a sweep of constructive interfering seismic signals along at least a portion of said subsurface formation, thereby inducing fractures in said subsurface formation.

8. The method of claim 7, wherein the step (a) comprises the step of determining a dominant fracture azimuth and a dominant fracture tilt in said subsurface formation.

9. The method of claim 8, wherein step (c) comprises the step of using said dominant fraction azimuth to determine a second location of a second vibratory seismic source spaced apart from said first seismic source,
   wherein said first and second locations are situated such that a line drawn through said first and second locations is approximately perpendicular to said fracture azimuth, and
   wherein said first and second locations are spaced apart from each other to provide a combined seismic wave plane which is parallel to said fracture tilt.

10. The method of claim 7, wherein the well bore is horizontal.

11. The method of claim 7, wherein said first and second vibratory seismic sources are both selected from a group consisting of a vibroseis vibrator, a weight drop source, an accelerated weight drop source, and a pile driver source.

12. The method of claim 7, wherein said first and second vibratory frequencies differ by an amount greater than 0.0 Hz and less than or equal to 0.01 Hz.

13. The method of claim 7, wherein steps (h) and (i) are performed a plurality of different times.

14. The method of claim 7, wherein steps (h) and (i) are performed a plurality of different times at two or more different first vibratory frequencies.

15. The method according to claim 7, wherein said first and second vibratory seismic sources generators are both chosen from a group consisting of an explosive seismic source, an air gun seismic source, a plasma seismic source, a simple gravity weight drop seismic source, an accelerated weight drop (AWD) seismic source, a high altitude weight drop (HAWD) seismic source, a seismic vibrator seismic source, a noise source, a boomer source, a counter rotating shaker source, a ground penetrating radar source, an electromagnetic source, a magnetometer source, a downhole hydraulic source, and an electromechanical rotary source.

16. The method according to claim 7, wherein the seismic source is a vibroseis seismic source which uses a foot configuration which is concave.

\* \* \* \* \*